(12) United States Patent
Kossman et al.

(10) Patent No.: US 6,965,986 B2
(45) Date of Patent: Nov. 15, 2005

(54) METHOD AND APPARATUS FOR IMPLEMENTING TWO-TIERED THREAD STATE MULTITHREADING SUPPORT WITH HIGH CLOCK RATE

(75) Inventors: Harold F. Kossman, Rochester, MN (US); Timothy John Mullins, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 10/246,937

(22) Filed: Sep. 19, 2002

(65) Prior Publication Data

US 2004/0059896 A1    Mar. 25, 2004

(51) Int. Cl.[7] .............................................. G06F 9/48
(52) U.S. Cl. .................................................... 712/228
(58) Field of Search ........................ 712/228; 718/108

(56) References Cited

U.S. PATENT DOCUMENTS

| | | | | |
|---|---|---|---|---|
| 5,766,515 A | * | 6/1998 | Jonas et al. ................. | 718/100 |
| 5,771,382 A | * | 6/1998 | Wang et al. ................. | 718/100 |
| 5,812,811 A | * | 9/1998 | Dubey et al. ............... | 712/216 |
| 5,815,727 A | * | 9/1998 | Motomura .................... | 712/1 |
| 5,872,963 A | * | 2/1999 | Bitar et al. ................. | 712/233 |
| 6,212,544 B1 | * | 4/2001 | Borkenhagen et al. ...... | 718/103 |
| 6,223,208 B1 | * | 4/2001 | Kiefer et al. ............... | 718/108 |
| 6,662,204 B2 | * | 12/2003 | Watakabe et al. ........... | 718/107 |

OTHER PUBLICATIONS

U.S. Appl. No. 10/246,912, filed Sep. 19, 2002.
"Method and Apparatus for Implementing Thread Replacement for Optimal Performance in a Two-Tiered Multithreading Structure".

* cited by examiner

*Primary Examiner*—Eric Coleman
(74) *Attorney, Agent, or Firm*—Joan Pennington

(57) ABSTRACT

A method and apparatus are provided for implementing two-tiered thread state multithreading support with a high clock rate. A first tier thread state storage stores a limited number of runnable thread register states. The limited number is less than a threshold value. Next thread selection logic coupled between the first tier thread state storage and a currently executing processor state, picks a next thread to run on a processor from the limited number of runnable thread register states. A second tier thread storage facility stores a second number of thread states that is greater than the limited number of runnable thread register states. A runnable thread selection logic coupled between the first tier thread state storage and the second tier thread storage facility, selectively exchanges thread states between the first tier limited number of runnable thread register states and the second tier thread storage facility.

12 Claims, 4 Drawing Sheets

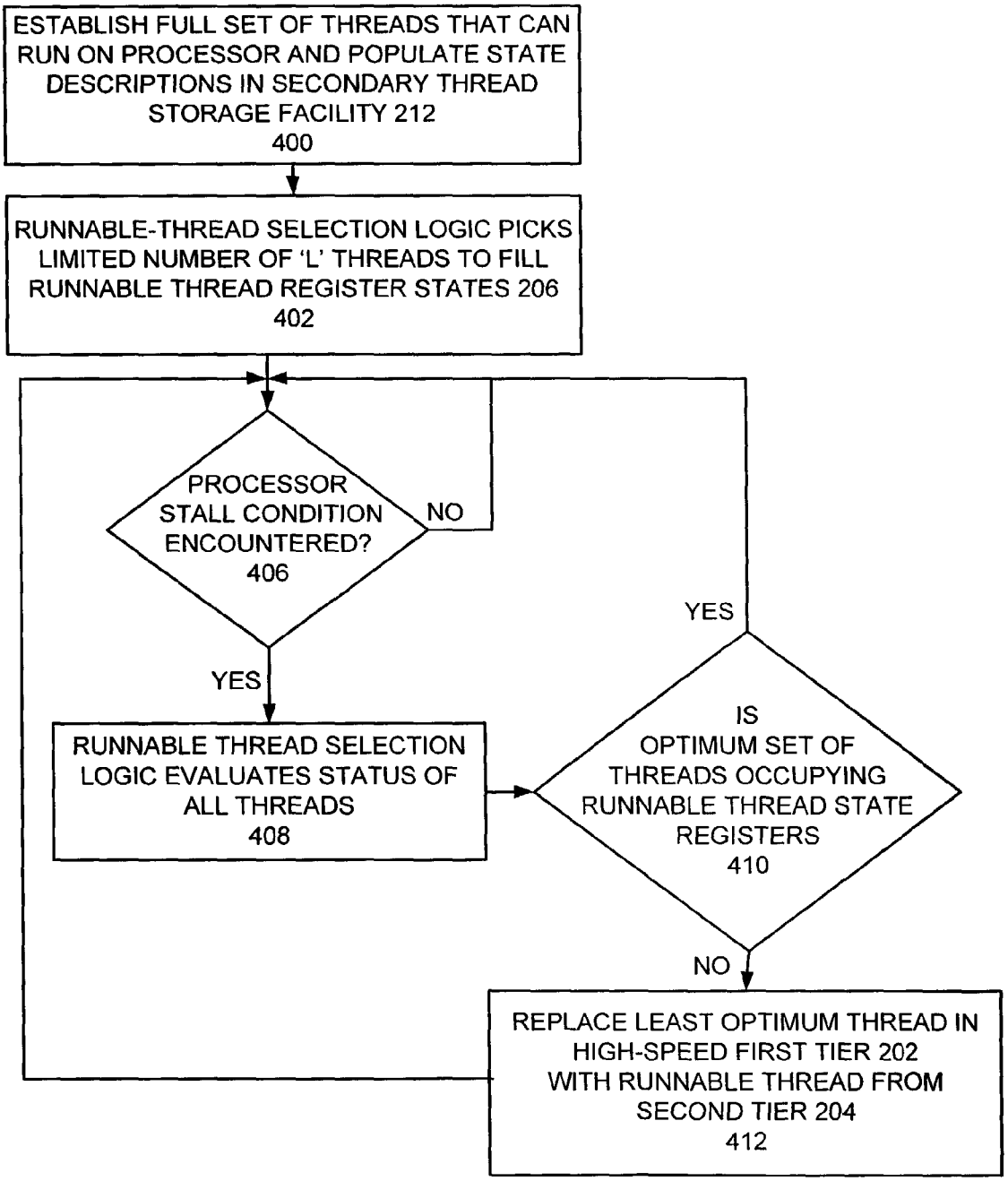

METHOD AND APPARATUS FOR IMPLEMENTING TWO-TIERED THREAD STATE MULTITHREADING SUPPORT WITH HIGH CLOCK RATE

FIELD OF THE INVENTION

The present invention relates generally to the data processing field, and more particularly, relates to a method and apparatus for implementing two-tiered thread state multithreading support with a high clock rate.

RELATED APPLICATION

A related U.S. patent application Ser. No. 10/246,912, entitled "METHOD AND APPARATUS FOR IMPLEMENTING THREAD REPLACEMENT FOR OPTIMAL PERFORMANCE IN A TWO-TIERED MULTITHREADING STRUCTURE" by Jeffrey Douglas Brown, Harold F. Kossman, and Timothy John Mullins, and assigned to the present assignee is being filed on the same day as the present patent application.

DESCRIPTION OF THE RELATED ART

Efficiency of hardware within the CPU is improved by dividing a processing task into independently executable sequences of instructions called threads. When the CPU, for any of a number of reasons, cannot continue the processing or execution of one of these threads, the CPU rapidly switches to and executes another thread. Multithreading is an effective way to improve the overall speed of a computer system or system throughput.

Multithreading design techniques have become an important means of enabling processor performance to scale up with clock frequency. Where past processor designs encountered stall conditions that degraded performance, multithreading allows continued execution of instructions by a separate parallel thread of activity. However, as clock frequencies continue to increase, more and more threads need to be supported in hardware to provide a continuously available option for execution by the processor.

Referring to FIG. 1, a prior art multithreading selection structure generally designated by 100 is shown. The prior art multithreading selection structure 100 is a single-tier design including a full complement of registers and other state-describing hardware for each thread of execution to be supported by the hardware, as indicated by a plurality of thread 0–N register states 102. The thread 0–N register states 102 provide a separate copy of state for each runnable thread 0–N. The prior art multithreading selection structure 100 includes next thread selection logic 104 coupled between the multiple thread 0–N register states 102 and a currently executing processor state 106 to select a next thread state 102 when setting a specific thread to run on the processor that is changed at idle events.

As clock frequency increases, more threads need to be supported in the machine, requiring a separate copy of state for each runnable thread 0–N. As clock frequency increases and the number of threads increase, the multithreading selection structure 100 and selection logic 104 become complex as the number of supported threads grows beyond some threshold limit. The selection logic 104 to enable the running of the next desired thread state 102 from among the many supported by hardware becomes complex and impacts the peak clock rate of the design.

Currently designers are forced to choose between the lesser of two degradations: 1) reduced clock speed to accommodate the logic necessary to have a large number of execution threads; or 2) limited and insufficient thread states to support instruction execution during stall conditions at the high clock rate.

A need exists for a mechanism that allows for an optimum condition for supporting a large number of threads in hardware without impacting clock rate.

SUMMARY OF THE INVENTION

A principal object of the present invention is to provide a method and apparatus for implementing two-tiered thread state multithreading support with a high clock rate. Other important objects of the present invention are to provide such method and apparatus for implementing two-tiered thread state multithreading support with a high clock rate substantially without negative effect and that overcome many of the disadvantages of prior art arrangements.

In brief, a method and apparatus are provided for implementing two-tiered thread state multithreading support with a high clock rate. A first tier thread state storage stores a limited number of runnable thread register states. The limited number is less than a threshold value. Next thread selection logic coupled between the first tier thread state storage and a currently executing processor state, picks a next thread to run on a processor from the limited number of runnable thread register states. A second tier thread storage facility stores a second number of thread states that is greater than the limited number of runnable thread register states. A runnable thread selection logic coupled between the first tier thread state storage and the second tier thread storage facility, selectively exchanges thread states between the first tier limited number of runnable thread register states and the second tier thread storage facility.

In accordance with features of the invention, the first tier thread state storage is high-speed logic, optimized for the high clock rate. The second tier thread storage facility optionally is medium-speed logic, lower than the fast clock rate. The second tier thread storage facility stores a number of thread states equal to a set number of threads required for peak processor performance. Threads with state present only in the second tier thread storage facility are not able to use the processor, but are available for quick selection by the runnable thread selection logic for exchanging thread states between the first-tier thread state storage and the second-tier thread storage facility.

BRIEF DESCRIPTION OF THE DRAWINGS

The present invention together with the above and other objects and advantages may best be understood from the following detailed description of the preferred embodiments of the invention illustrated in the drawings, wherein:

FIG. 4 is a flow diagram illustrating exemplary operations of a runnable-thread selection logic in accordance with the preferred embodiment.

DETAILED DESCRIPTION OF THE PREFERRED EMBODIMENTS

Figure 1:
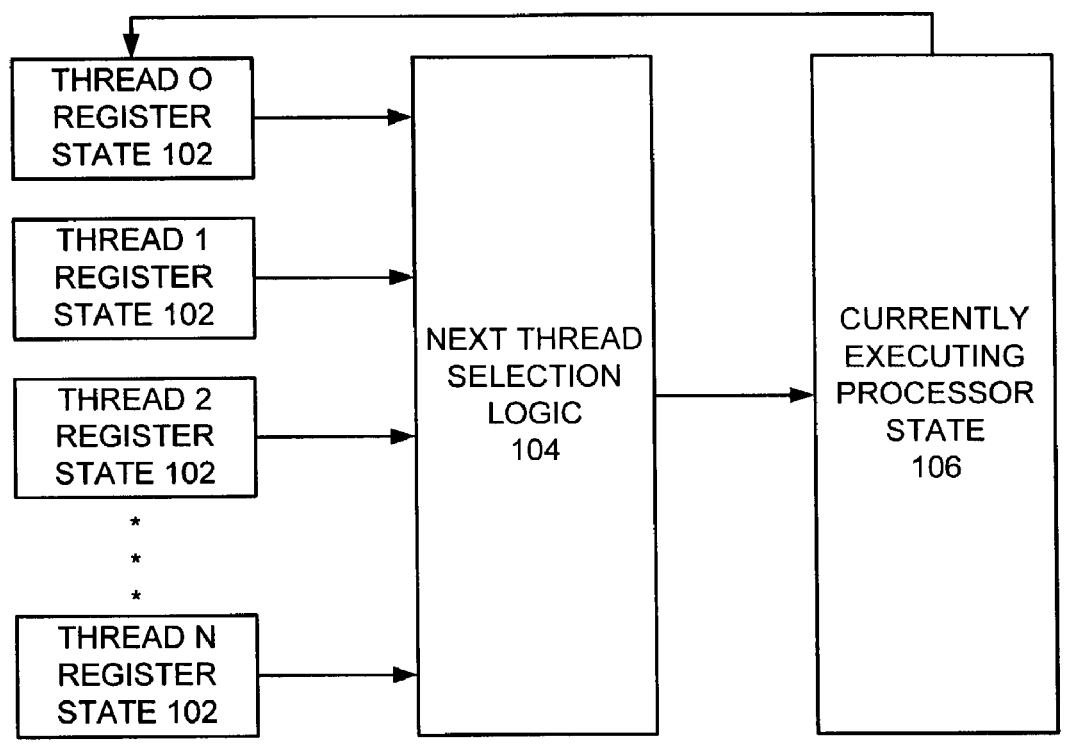
FIG. 1 is a block diagram of a prior art multithreading selection structure.
Figure 2:
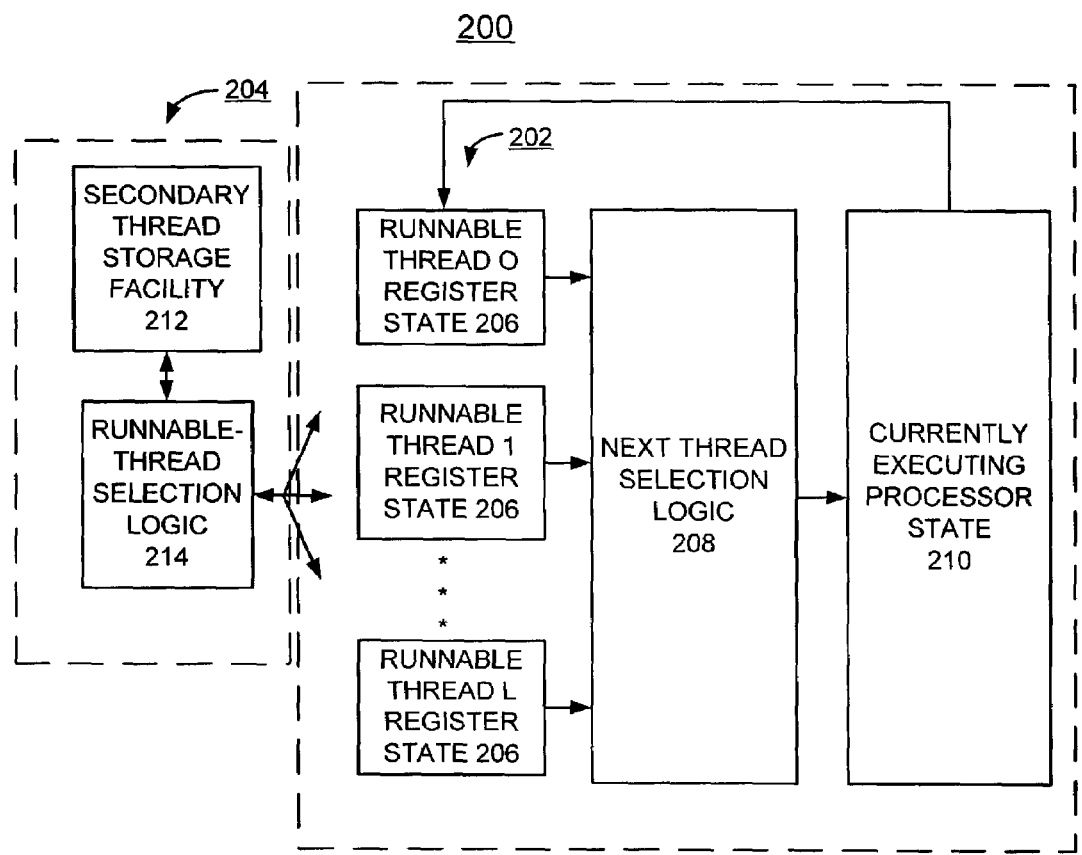
FIG. 2 is a block diagram of a two-tiered multithreading selection structure in accordance with the preferred embodiment.

Having reference now to the drawings, in FIG. 2, there is shown a multithreading selection structure generally designated by the reference character 200 of the preferred embodiment. Multithreading selection structure 200 includes two tiers of thread state storage generally designated by 202 and 204. The first-tier thread state storage 202 is high-speed logic, optimized for fast clock rate. The second-tier thread state storage 204 optionally is a moderate-speed logic, operating at a lower speed than the high-speed logic of the first-tier state storage 202.

In accordance with features of the preferred embodiment, multithreading selection structure 200 provides support for a large number of threads in hardware without impacting clock rate. Multithreading selection structure 200 avoids the penalty to clock rate that can occur when the number of register logic replications needs to grow beyond a particular threshold. Traditionally, all threads of execution are supported in hardware by logic circuits of the same organization and speed. Instead, a first aspect of the invention calls for a limit to a number L of these register logic replications in the first tier 202 to something less than the particular threshold quantity. This allows for the clock rate to be increased without impact. However, simply limiting the thread register state sets for a processor at high clock speed would create a performance imbalance. Undesired stall conditions arise and cannot be overcome as they occur due to the lack of threads available to run.

Overcoming this imbalance requires a second aspect of this invention; support for additional threads in the second tier 204 of state storage in the processor. This second tier 204 provides capacity to hold state information for the full, total number of threads needing hardware support to achieve peak performance. Threads with state present only in the second tier 204 are not able to use the processor, but are available for quick selection by control logic. This selection may not be as fast as when selecting threads from the first-tier 202 of state storage, but is significantly quicker than performing a save/restore scenario to a main memory of the processor, a traditional approach to gaining state capacity. Information for a particular thread state held in the second tier can be exchanged as necessary with that of a particular thread state 0–L stored in the first tier 202. Typically this would occur when a thread running out of first-tier thread state storage 202 encounters a processor stall condition.

As shown in FIG. 2, the two-tier multithreading selection structure 200 limits the number of a plurality of runnable threads 0–L register states 206 for multiple threads of processor execution in the first tier 202. The multithreading selection structure 200 includes a next thread selection logic 208 coupled between the first tier runnable threads 0–L register states 206 and a currently executing processor state 210 to select a next thread state 206 quickly when setting a specific thread to run on the processor that is changed at idle events. This implementation of the first tier 202 of state storage enables a high clock rate, but alone would limit the peak performance of the design without further aspects of this invention.

Additional capacity is provided for the total number of threads needed to support peak performance at high clock rate in a secondary thread storage facility 212 in the second-tier thread state storage 204. This overcomes the otherwise peak performance limitation. In addition to the state of each thread, storage area is provided to contain information useful in determining the next thread to be selected from second-tier state storage 204 when determined that an exchange with first-tier register state storage is needed by a runnable-thread selection logic 214. Threads execute on the processor only from the first-tier register state storage 206, as has been provided for in current state of the art. At appropriate points of time as determined by processor control logic, the runnable-thread selection logic 214 calls for thread states to be exchanged between the first-tier 202 and second-tier 204 of thread state storage. Typically, this would allow a particular runnable thread from second-tier storage 212 to gain access to the processor facilities in first tier register space, while maintaining in a condition ready for re-call a stalled thread that had been using first-tier resources 206.

Figure 3:
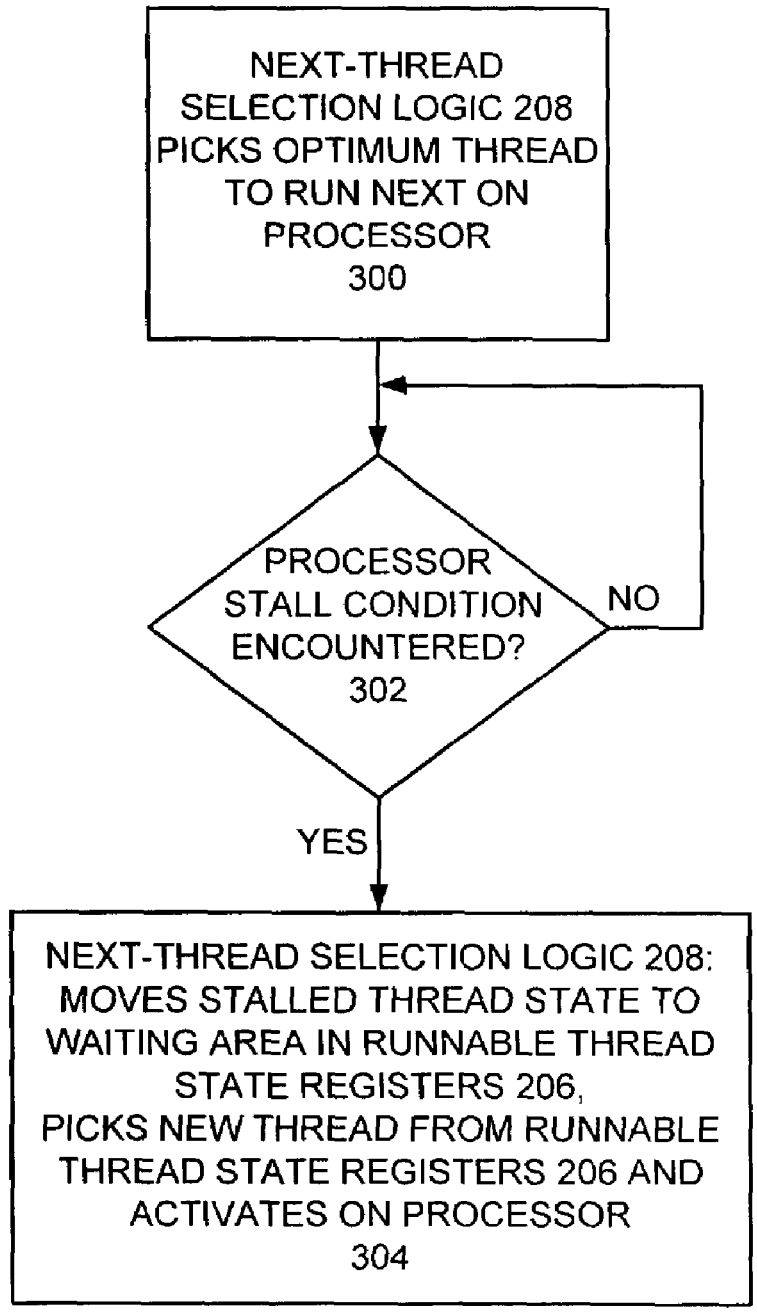
FIG. 3 is a flow diagram illustrating exemplary operations of a next thread selection in accordance with the preferred embodiment.

Referring to FIG. 3, there are shown exemplary operations of the next thread selection logic 208 in the multithreading selection structure 200 in accordance with the preferred embodiment. As indicated in a block 300, the next thread selection logic 208 picks an optimum thread to run next on the processor. Checking is performed for a processor stall condition being encountered as indicated in a decision block 302. When a processor stall condition is encountered, the next thread selection logic 208 moves the stalled thread state to a waiting area in the runnable thread state registers 206; picks a new thread from the runnable thread state registers 206, and activates on the processor. Then the operation returns for checking for a processor stall condition being encountered at decision block 302.

Referring to FIG. 4, there are shown exemplary operations of the runnable-thread selection logic 214 in accordance with the preferred embodiment. First runnable-thread selection logic 214 establishes a full set of threads that can run on the processor and populates state descriptions in the secondary thread storage facility 212 as indicated in a block 400. Next runnable-thread selection logic 214 picks a limited number of L threads to fill the runnable thread register states 206. Checking is performed for a processor stall condition being encountered as indicated in a decision block 406. When a processor stall condition is encountered, the runnable-thread selection logic 214 evaluates the status of all threads as indicated in a block 408. Next runnable-thread selection logic 214 determines whether an optimum set of threads is occupying the runnable thread register states 206 as indicated in a decision block 410. When an optimum set of threads is occupying the runnable thread register states 206, then the operation returns for checking for a processor stall condition being encountered at decision block 406. Otherwise when an optimum set of threads is occupying the runnable thread register states 206, then a least optimum thread in the high-speed first tier 202 is replaced with a runnable thread form the second tier 204 as indicated in a block 412. Then the operation returns for checking for a processor stall condition being encountered at decision block 406.

While the present invention has been described with reference to the details of the embodiments of the invention shown in the drawing, these details are not intended to limit the scope of the invention as claimed in the appended claims.

What is claimed is:

1. Apparatus for implementing two-tiered thread state multithreading support with a high clock rate comprising:
   a first tier thread state storage for storing a limited number of runnable thread register states; said limited number being less than a threshold value;
   next thread selection logic coupled between said first tier thread state storage and a currently executing processor state for picking a next thread to run on a processor from said limited number of runnable thread register states;

a second tier thread storage facility for storing a second number of thread states; said second number of thread states being greater than said limited number of runnable thread register states;

a runnable thread selection logic coupled between said first tier thread state storage and said second tier thread storage facility for exchanging thread states between said first tier limited number of runnable thread register states and said second tier thread storage facility; said runnable thread selection logic identifies a processor stall condition; evaluates a status of all threads; and checks for an optimum set of threads occupying said runnable thread register states.

2. Apparatus for implementing two-tiered thread state multithreading support with a high clock rate as recited in claim 1 wherein said first tier of a limited number of runnable thread register states is high-speed logic, optimized for the high clock rate.

3. Apparatus for implementing two-tiered thread state multithreading support with a high clock rate as recited in claim 1 wherein threads execute on the processor only from said first tier of a limited number of runnable thread register states.

4. Apparatus for implementing two-tiered thread state multithreading support with a high clock rate as recited in claim 1 wherein said second tier thread storage facility for said second number of thread states is moderate-speed logic, said moderate-speed being lower than the fast clock rate.

5. Apparatus for implementing two-tiered thread state multithreading support with a high clock rate as recited in claim 1 wherein said second number of thread states equals a set number of threads to support peak processor performance.

6. Apparatus for implementing two-tiered thread state multithreading support with a high clock rate as recited in claim 1 wherein said next thread selection logic moves a currently stalled thread state to a waiting area in said runnable thread register states; picks a next thread from said runnable thread register states; and activates said next thread on said processor.

7. Apparatus for implementing two-tiered thread state multithreading support with a high clock rate as recited in claim 1 wherein said runnable thread selection logic establishes a full set of threads that can run on said processor and populates state descriptions in said second tier thread storage facility.

8. Apparatus for implementing two-tiered thread state multithreading support with a high clock rate as recited in claim 7 wherein said runnable thread selection logic picks a set of threads to fill said limited number of said runnable thread register states.

9. Apparatus for implementing two-tiered thread state multithreading support with a high clock rate as recited in claim 1 wherein said runnable thread selection logic responsive to an optimum set of threads not occupying said runnable thread register states, replaces a least optimum thread in said first tier with a thread from said second tier.

10. A method for implementing two-tiered thread state multithreading support as with a high clock rate comprising:

utilizing first-tier state storage logic optimized for the high clock rate, storing a limited number of runnable thread register states;

utilizing a second tier storage facility, storing state descriptions for a second number of thread states; said second number of thread states being greater than said limited number of runnable thread register states and equal to a set number of threads to run on a processor;

utilizing next thread selection logic, selecting a next thread to run on said processor only from said limited number of runnable thread register states;

utilizing runnable thread selection logic, selectively exchanging thread states between said first tier state storage logic and said second tier storage facility; identifying a processor stall condition; evaluating a status of all threads to run on said processor; and checking for an optimum set of threads occupying said runnable thread register states.

11. A method for implementing two-tiered thread state multithreading support as recited in claim 10 wherein the step of selecting the next thread to run on said processor includes the step of identifying a processor stall condition; moving a currently stalled thread state to a waiting area in said first-tier state storage logic; picking the next thread from said limited number of runnable thread register states; and activating said next thread on said processor.

12. A method for implementing two-tiered thread state multithreading support as recited in claim 10 further includes the step responsive to an optimum set of threads not occupying said runnable thread register states, of replacing a least optimum thread in said first tier runnable thread register states with one thread from said second tier storage facility.

* * * * *